United States Patent
Ahn et al.

(10) Patent No.: US 9,787,384 B2
(45) Date of Patent: *Oct. 10, 2017

(54) METHOD AND APPARATUS FOR TRANSMITTING CHANNEL STATE INFORMATION

(71) Applicant: LG ELECTRONICS INC., Seoul (KR)

(72) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,476

(22) Filed: Jul. 15, 2015

(65) Prior Publication Data

US 2015/0318910 A1    Nov. 5, 2015

Related U.S. Application Data

(63) Continuation of application No. 13/806,642, filed as application No. PCT/KR2011/004492 on Jun. 20, 2011, now Pat. No. 9,119,203.

(Continued)

(51) Int. Cl.
*H04W 4/00*  (2009.01)
*H04B 7/06*  (2006.01)
(Continued)

(52) U.S. Cl.
CPC ......... *H04B 7/0626* (2013.01); *H04B 7/0639* (2013.01); *H04L 1/0031* (2013.01);
(Continued)

(58) Field of Classification Search
USPC .................. 370/246–345, 352–401
See application file for complete search history.

(56) References Cited

U.S. PATENT DOCUMENTS 8,014,455 B2    9/2011    Kim et al.
8,325,846 B2    12/2012    Ko et al.
(Continued)

FOREIGN PATENT DOCUMENTS

CN    101411110 A    4/2009
JP    2009-531993 A    9/2009
(Continued)

*Primary Examiner* — Man Phan
(74) *Attorney, Agent, or Firm* — Birch, Stewart, Kolasch & Birch, LLP

(57) ABSTRACT

A method for transmitting channel status information in a wireless communication system. A user equipment (UE) transmits first channel information indicating a set of precoding matrices to a base station (BS) periodically, and transmits second channel information indicating one precoding matrix included in the set of precoding matrices to the BS periodically. The second channel information transmitted in a specific subframe is determined based on first channel information that has most recently been transmitted before the specific subframe. Additionally, the UE calculates a channel quality indicator (CQI) transmitted in the specific subframe based on one precoding matrix specified by the first channel information that has most recently been transmitted before the specific subframe and by the second channel information determined based on the first channel information that has most recently been transmitted before the specific subframe.

6 Claims, 14 Drawing Sheets

Related U.S. Application Data

(60) Provisional application No. 61/357,514, filed on Jun. 22, 2010.

(51) Int. Cl.
  *H04L 5/00* (2006.01)
  *H04L 1/06* (2006.01)
  *H04W 72/04* (2009.01)
  *H04L 1/00* (2006.01)

(52) U.S. Cl.
  CPC .............. *H04L 1/06* (2013.01); *H04L 5/0053* (2013.01); *H04L 5/0057* (2013.01); *H04W 72/0446* (2013.01); *H04L 1/0026* (2013.01)

(56) References Cited

U.S. PATENT DOCUMENTS

| | | | |
|---|---|---|---|
| 8,351,535 B2 | 1/2013 | Kim et al. | |
| 8,503,555 B2 | 8/2013 | Kim et al. | |
| 8,681,651 B2 * | 3/2014 | Bhattad | H04L 5/0032 370/246 |
| 8,744,361 B2 | 6/2014 | Shin et al. | |
| 9,100,870 B2 * | 8/2015 | Yang | H04B 7/0626 |
| 9,161,153 B2 * | 10/2015 | Kuo | H04L 1/0029 |
| 9,184,818 B2 * | 11/2015 | Kim | H04B 7/024 |
| 9,294,168 B2 * | 3/2016 | Kim | H04B 7/0417 |
| 9,357,434 B2 * | 5/2016 | Ko | H04L 1/0026 |
| 9,397,796 B2 * | 7/2016 | Papasakellariou | H04B 7/2643 |
| 2008/0032630 A1 | 2/2008 | Kim et al. | |
| 2008/0049709 A1 | 2/2008 | Pan et al. | |
| 2009/0046800 A1 | 2/2009 | Xu et al. | |
| 2009/0203335 A1 | 8/2009 | Lee et al. | |
| 2010/0118989 A1 | 5/2010 | Sayana et al. | |
| 2010/0310000 A1 | 12/2010 | Ko et al. | |
| 2011/0299626 A1 | 12/2011 | Kim et al. | |
| 2012/0008587 A1 | 1/2012 | Lee et al. | |
| 2012/0093089 A1 | 4/2012 | Park et al. | |
| 2013/0044624 A1 * | 2/2013 | Su | H04L 1/0026 370/252 |
| 2015/0117355 A1 * | 4/2015 | Kim | H04B 7/024 370/329 |
| 2015/0327106 A1 * | 11/2015 | Lee | H04W 24/10 370/252 |

FOREIGN PATENT DOCUMENTS

| | | |
|---|---|---|
| JP | 2010-41473 A | 2/2010 |
| JP | 2010-114893 A | 5/2010 |
| KR | 10-2009-0083834 A | 8/2009 |
| KR | 10-0913940 B1 | 8/2009 |
| WO | 2009/131376 A2 | 10/2009 |

* cited by examiner ically,

METHOD AND APPARATUS FOR TRANSMITTING CHANNEL STATE INFORMATION

CROSS-REFERENCE TO RELATED APPLICATIONS

This application is a continuation of co-pending U.S. patent application Ser. No. 13/806,642 filed on Dec. 21, 2012, which is the national phase of PCT International Application No. PCT/KR2011/004492 filed on Jun. 20, 2011, which claims the benefit of U.S. Provisional Application No. 61/357,514 filed on Jun. 22, 2010. The entire contents of all of the above applications are hereby incorporated by reference.

BACKGROUND OF THE INVENTION

Field of the Invention

The present invention relates to wireless communication and, more specifically, to a method and apparatus for transmitting channel status information in a wireless communication system.

Discussion of the Related Art

One of the most important requirements of the next-generation wireless communication system is to support a requirement for a high data transfer rate. To this end, research is being carried out on various technologies, such as Multiple Input Multiple Output (MIMO) and Cooperative Multiple Point transmission (CoMP), and a relay, but the most basic and stable solution is to increase the bandwidth.

However, frequency resources are now in the saturation state, and various technologies are partially being used in wide-ranging frequency bands. For this reason, as a scheme for securing a wide bandwidth in order to satisfy requirements for a higher data transfer rate, a Carrier Aggregation (CA) having a concept that each of scattered bands is designed to satisfy a basic requirement capable of operating an independent system and a number of bands are bundled into one system is being introduced. Here, a band that can be independently operated is defined as a Component Carrier (CC).

In order to support an increasing transmission capacity, in a recent communication standard, for example, a standard, such as 3GPP LTE-A or 802.16m, the extension of a 20 MHz or higher bandwidth is taken into consideration. In this case, a broadband is supported by aggregating one or more CCs. For example, if one CC corresponds to a bandwidth of 5 MHz, a bandwidth of a maximum of 20 MHz is supported by aggregating four carriers. A system using a CA as described above is called a multi-carrier system.

Meanwhile, for the purpose of efficient communication between a base station and a terminal, channel status information needs to be fed back. Channel state information fed back from a terminal and a base station can be plural according to circumstances, and one piece of channel status information can be generated and interpreted based on the other piece of channel status information. In this case, for example, the one piece of channel status information cannot be transmitted for some reasons and only the other piece of channel status information can be transmitted. Here, whether a terminal will transmit the other piece of channel status information or not using what method can be problematic.

Furthermore, from a viewpoint of a base station, how the other piece of channel status information will be interpreted and applied can be problematic.

SUMMARY OF THE INVENTION

There are provided a method and apparatus in which UE transmits channel status information in a wireless communication system.

A method of a mobile station sending channel status information in a multi-carrier system in accordance with an aspect of the present invention includes receiving a reference signal from a base station; transmitting first channel information to the base station; and transmitting second channel information to the base station, wherein the first channel information and the second channel information are pieces of information combined to indicate one precoding matrix estimated using the reference signal.

The first channel information may include information indicative of one or more precoding matrices estimated using the reference signal, and the second channel information may include information indicative of any one of the one or more precoding matrices indicated by the first channel information.

The first channel information may be configured so that the first channel information is transmitted in subframes having a first period, the second channel information may be configured so that the second channel information is transmitted in subframes having a second period, and the first period may be greater than the second period.

If the first channel information is dropped in a specific subframe included in the subframes having the first period, the second channel information transmitted after the specific subframe may be determined based on the first channel information that has most recently been transmitted based on the specific subframe.

A Channel Quality Indicator (CQI) transmitted after the specific subframe may be generated based on a precoding matrix specified by the first channel information that has most recently been transmitted based on the specific subframe and the second channel information determined based on the first channel information that has most recently been transmitted.

The first channel information and the second channel information may be generated for each of a plurality of downlink component carriers and transmitted.

If the first channel information on any one of the plurality of downlink component carriers is dropped in a specific subframe, the second channel information after the specific subframe may be determined based on the first channel information on the any one downlink component carrier that has most recently been transmitted based on the specific subframe.

The first channel information and the second channel information may be generated for each of a plurality of downlink component carrier groups and transmitted.

If the first channel information on any one of the plurality of downlink component carrier groups is dropped in a specific subframe, the second channel information after the specific subframe may be determined based on the first channel information on the any one downlink component carrier group that has most recently been transmitted based on the specific subframe.

The first channel information and the second channel information may be transmitted through a physical uplink control channel.

A mobile station in accordance with another aspect of the present invention includes a Radio Frequency (RF) unit transmitting and receiving radio signals and a processor connected to the RF unit, wherein the processor receives a reference signal from a base station and transmits first channel information and second channel information to the base station, and the first channel information and the second channel information are pieces of information combined to indicate one precoding matrix estimated using the reference signal.

The first channel information may include information indicative of one or more precoding matrices estimated using the reference signal, and the second channel information may include information indicative of any one of the one or more precoding matrices indicated by the first channel information.

The first channel information may be configured so that the first channel information is transmitted in subframes having a first period, the second channel information may be configured so that the second channel information is transmitted in subframes having a second period, and the first period may be greater than the second period.

If the first channel information is dropped in a specific subframe included in the subframes having the first period, the second channel information transmitted after the specific subframe may be determined based on the first channel information that has most recently been transmitted based on the specific subframe.

Although a mobile station does not transmit some of pieces of channel status information in a wireless communication system, a base station can recognize a channel state with the mobile station. Accordingly, the reliability of communication can be improved because precoding matrices into which a channel state between a base station and a mobile station has been incorporated are efficiently applied.

DETAILED DESCRIPTION OF THE INVENTION

Long Term Evolution (LTE) according to the 3rd Generation Partnership Project (3GPP) standardization organization is part of Evolved-UMTS (E-UMTS) that uses an Evolved-Universal Terrestrial Radio Access Network (E-UTRAN), and it adopts Orthogonal Frequency Division Multiple Access (OFDMA) in downlink and adopts Single Carrier-Frequency Division Multiple Access (SC-FDMA) in uplink. LTE-Advanced (A) is the evolution of LTE. In order to clarify a description hereinafter, 3GPP LTE/LTE-A are basically described, but the technical spirit of the present invention is not limited thereto.

Figure 1:
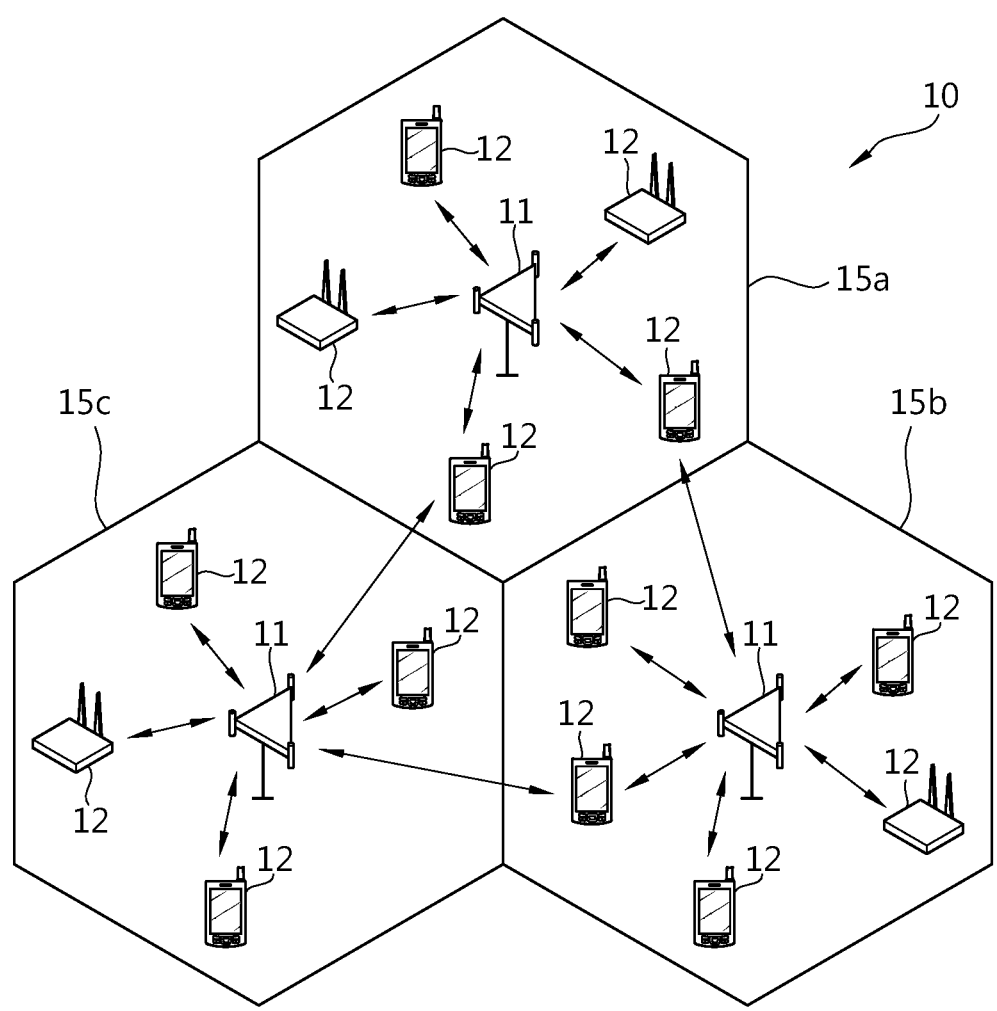
FIG. 1 shows a wireless communication system.

FIG. 1 shows a wireless communication system.

Referring to FIG. 1, the wireless communication system 10 includes one or more Base Stations (BSs) 11. The BSs 11 provide communication services to specific geographical areas 15 commonly called cells. Each of the cells may be divided into a plurality of areas, and each of the areas is called a sector. One BS may include one or more cells. In general, the BS 11 refers to a fixed station that communicates with UEs 13, and it may also be called another terminology, such as an evolved NodeB (eNB), a Base Transceiver System (BTS), an access point, or an Access Network (AN).

The User Equipment (UE) 12 may be fixed or mobile and may also be called another terminology, such as a Mobile Station (MS), a User Terminal (UT), a Subscriber Station (SS), a wireless device, a Personal Digital Assistant (PDA), a wireless modem, a handheld device, or an Access Terminal (AT).

Hereinafter, downlink (DL) refers to communication from the BS 11 to the UE 12, and uplink (UL) refers to communication from the UE 12 to the BS 11.

The wireless communication system 10 may be a system which supports bidirectional communication. Bidirectional communication can be performed using Time Division Duplex (TDD) mode, Frequency Division Duplex (FDD) mode or the like. TDD mode uses different time resources in UL transmission and DL transmission. FDD mode uses different frequency resources in UL transmission and DL transmission. The BS 11 and the UE 12 communicate with each other using radio resources called radio frames.

Figure 2:
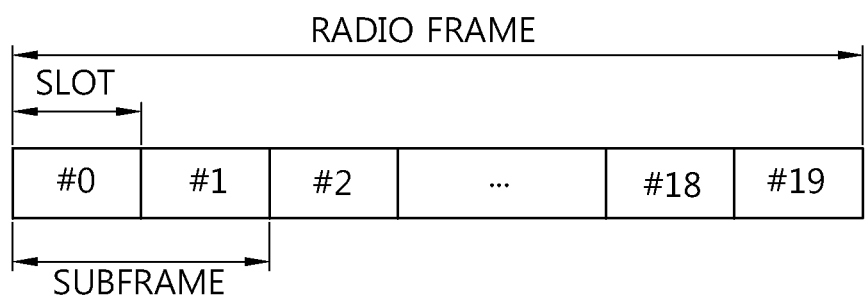
FIG. 2 shows the structure of a radio frame.

FIG. 2 shows the structure of a radio frame.

Referring to FIG. 2, the radio frame includes 10 subframes, and one subframe includes two slots. The length of one subframe may be 1 ms, and the length of one slot may be 0.5 ms. The time that it takes to transmit one subframe is called a Transmission Time Interval (TTI). The TTI may be a minimum scheduling unit.

One slot may include a plurality of Orthogonal Frequency Division Multiplexing (OFDM) symbols in the time domain. The OFDM symbol is used to represent one symbol period because 3GPP LTE uses OFDMA in downlink and may be called another terminology according to a multiple access scheme. For example, if SC-FDMA is used as an uplink multiple access scheme, corresponding symbols may be called SC-FDMA symbols. One slot is illustrated as including 7 OFDM symbols, but the number of OFDM symbols included in one slot may be changed depending on the length of a Cyclic Prefix (CP). In accordance with 3GPP TS 36.211 V8.5.0 (2008-12), 1 subframe includes 7 OFDM symbols in a normal CP, and 1 subframe includes 6 OFDM symbols in an extended CP. The structure of the radio frame is only an example, and the number of subframes included in the radio frame and the number of slots included in the subframe may be changed in various ways.

Figure 3:
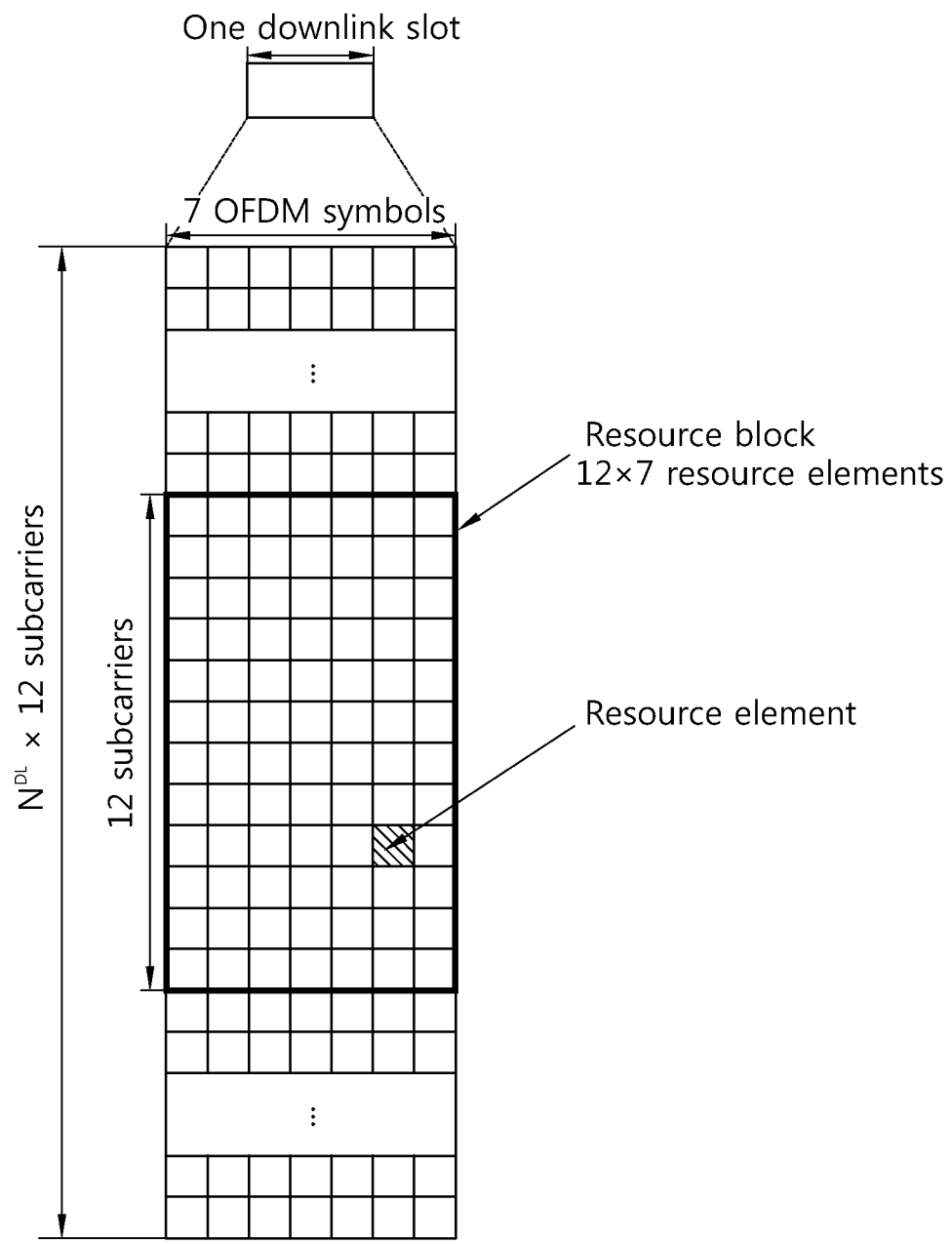
FIG. 3 shows an example of a resource grid for one downlink slot.

FIG. 3 shows an example of a resource grid for one downlink slot.

Referring to FIG. 3, the downlink slot includes a plurality of OFDM symbols in the time domain and includes $N_{RB}$ Resource Blocks (RBs) in the frequency domain. The resource block is a resource allocation unit, and it includes one slot in the time domain and includes a plurality of contiguous subcarriers in the frequency domain.

The number of resource blocks $N_{RB}$ included in a downlink slot depends on a downlink transmission bandwidth configured in a cell. For example, in an LTE system, the number of resource blocks $N_{RB}$ may be any one of 6 to 110. An uplink slot may have the same structure as the downlink slot.

Each of elements on the resource grid is called a Resource Element (RE). The resource elements on the resource grid may be identified by an index pair (k, l) within a slot. Here, k (k=0, ..., $N_{RB}$×12-1) indicates a subcarrier index in the frequency domain, and l (l=0, ..., 6) indicates an OFDM symbol index in the time domain.

In FIG. 3, one resource block is illustrated as including 7×12 resource elements, including 7 OFDM symbols in the time domain and 12 subcarriers in the frequency domain. However, the number of OFDM symbols and the number of subcarriers within a resource block are not limited thereto. The number of OFDM symbols and the number of subcarriers may be changed in various ways depending on the length of a CP, frequency spacing, etc. For example, the number of OFDM symbols is 7 in case of a normal CP, and the number of OFDM symbols is 6 in case of an extended CP. One of 128, 256, 512, 1024, 1536, and 2048 may be selected and used as the number of subcarriers in one OFDM symbol.

Figure 4:
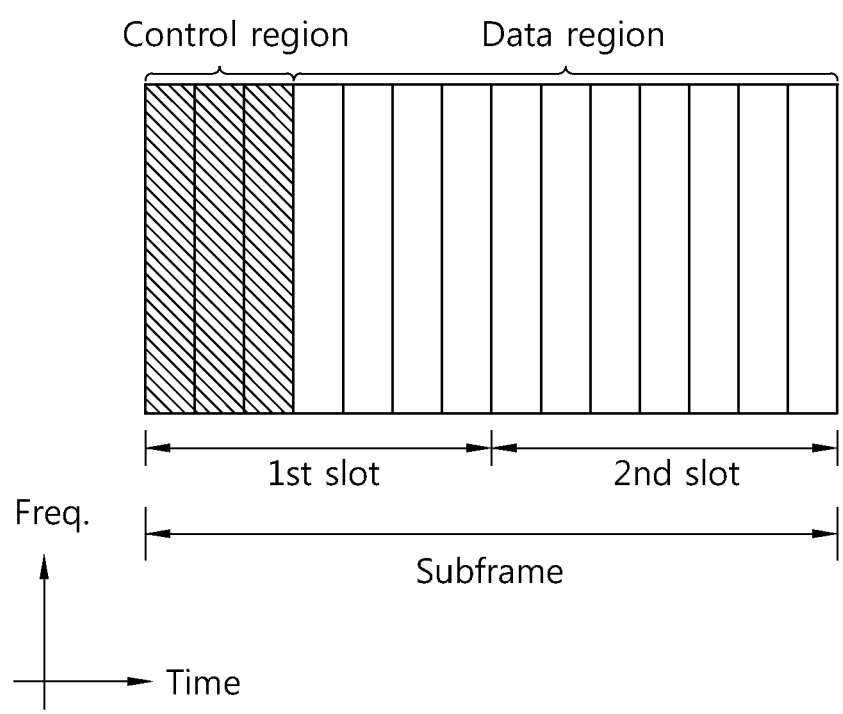
FIG. 4 shows an example of the structure of a downlink subframe in 3GPP LTE.

FIG. 4 shows an example of the structure of a downlink subframe in 3GPP LTE. The subframe includes two consecutive slots. A maximum of three former OFDM symbols of a first slot within the downlink subframe become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid ARQ indicator channel (PHICH), in addition to the PDCCH can be allocated to the control region. UE can read data information transmitted through the PDSCHs by decoding control information transmitted through the PDCCH. Here, the control region is illustrated as including the 3 OFDM symbols, but this is only illustrative. The PDCCH carries a downlink grant that informs the allocation of the resources of downlink transmission on the PDSCH. More particularly, the PDCCH can carry the allocation of the resources of the transport format of a downlink shared channel (DL-SCH), paging information on a paging channel (PCH), system information on a DL-SCH, the allocation of the resources of a higher layer control message, such as a random access response transmitted on a PDSCH, a transmission power control command, and the activation of a voice over IP (VoIP). Furthermore, the PDCCH carries an uplink grant that informs UE of the allocation of resources of uplink transmission. The number of OFDM symbols included in the control region within the subframe can be known by a PCFICH. The PHICH carries Hybrid Automatic Repeat reQuest (HARQ) acknowledgment (ACK)/negative-acknowledgement (NACK) signals in response to uplink transmission.

Figure 5:
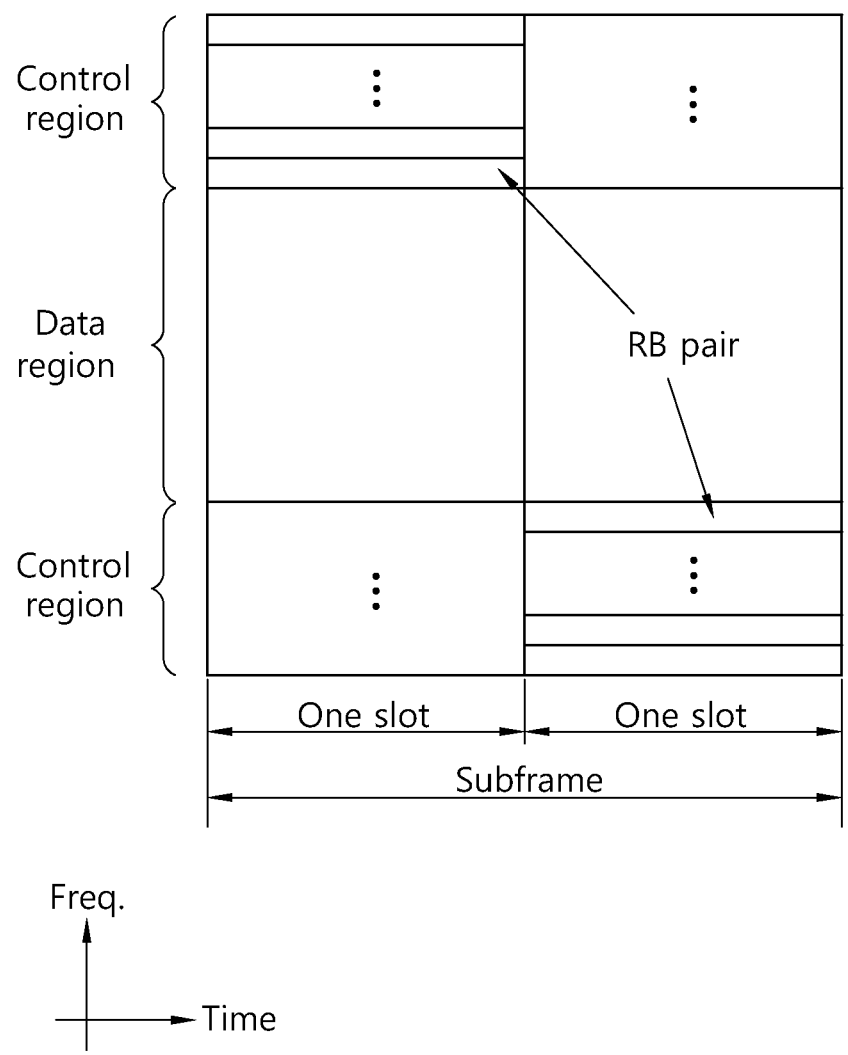
FIG. 5 shows the structure of an uplink subframe.

FIG. 5 shows the structure of an uplink subframe.

Referring to FIG. 5, the uplink subframe can be divided into a control region and a data region in the frequency domain. A physical uplink control channel (PUCCH) on which uplink control information is transmitted is allocated to the control region. A physical uplink shared channel (PUSCH) on which data (control information may also be transmitted according to circumstances) is transmitted is allocated to the data region. UE may transmit a PUCCH and a PUSCH at the same time or may transmit only one of a PUCCH and a PUSCH depending on a configuration.

A PUCCH for an MS is allocated in the form of a resource block pair (RB pair) in the subframe. Resource blocks that belong to the resource block pair occupy different subcarriers in a first slot and a second slot. A frequency that is occupied by the resource blocks belonging to the resource block pair to which a PUCCH is allocated is changed on the basis of a slot boundary. This is said that the RB pair allocated to the PUCCH has been subjected to frequency-hopped at the slot boundary. UE can obtain a frequency diversity gain by transmitting uplink control information through different subcarriers according to the time.

A Hybrid Automatic Repeat reQuest (HARQ) acknowledgement (ACK)/non-acknowledgement (NACK), and Channel Status Information (CSI) (e.g., a Channel Quality Indicator (CQI), a Precoding Matrix Index (PMI), a Precoding Type Indicator (PTI), and a Rank Indication (RI)) indicating a downlink channel state can be transmitted on the PUCCH.

The PUSCH is mapped to an UL-Uplink Shared Channel (SCH), that is, a transport channel. Uplink data transmitted on the PUSCH may be a transport block, that is, a data block for the UL-SCH transmitted during a TTI. The transport block may include user data. Or, the uplink data may be multiplexed data. The multiplexed data may be the multiplexing of the transport block for the UL-SCH and channel status information. For example, the channel status information multiplexed into the data may be a CQI, a PMI, or an RI. Or, the uplink data may include only the channel status information.

1. CSI in a Wireless Communication System

A) Channel State Information (CSI)

For the purpose of efficient communication, channel information needs to be fed back. In general, downlink channel information is transmitted in uplink, and uplink channel information is transmitted in downlink. Channel information indicating the state of a channel is called CSI, and the CSI includes a CQI, a PMI, an RI, etc. The CQI provides information on a link adaptive parameter that can be supported by UE for a given time. The PMI provides information on a precoding matrix in the precoding based on a codebook. The PMI is related to Multiple Input Multiple Output (MIMO). In MIMO, the feedback of a PMI is called closed-loop MIMO. Downlink transmission mode is classified into 9 types below. PMI feedback is used in 4, 5, 6, and 9 in the 9 types of downlink transmission mode. In downlink transmission mode 8, when a PMI/RI report is set, UE feeds a PMI back.

Single antenna port: mode in which precoding is not performed.

Transmission diversity: Transmission diversity can be used in 2 or 4 antenna ports which use SFBC.

Open-loop space multiplexing: open-loop mode rank adaptation based on RI feedback can be applied. If the rank is 1, transmission diversity can be applied. If the rank is greater than 1, great delay CDD can be used.

Closed-loop space multiplexing: mode n which precoding feedback supporting dynamic rank adaptation is applied.

Multi-User MIMO

Closed-loop space multiplexing having a single transmission layer

Single antenna port: mode that can be used in beamforming when a UE-specific reference signal is used. If the number of PBCH antenna ports is 1, a single antenna port (port 0) is used. If not, transmission diversity is used.

Transmission of a dual layer: the transmission of a dual layer using antenna ports 7 and 8 or the transmission of a single antenna port using an antenna port 7 or an antenna port 8.

Closed-Loop Space Multiplexing.

Transmission of a maximum of 8 layers: The transmission of a maximum of 8 layers using an antenna port 7 to 14. Closed-loop space multiplexing.

An RI is information on the number of layers that are recommended by UE. That is, the RI indicates the number of streams used in space multiplexing. The RI is fed back only when UE operates in MIMO mode using space multiplexing. That is, the RI is fed back only in 3, 4, 8, and 9 from the 9 types of downlink transmission mode. For example, in single antenna port mode or transmission diversity mode, the RI is not fed back. The RI may have a value 1 or 2 in a 2×2 antenna configuration and may have one of 1 to 4 in a 4×4 antenna configuration. The RI is always related to one or more CQI feedbacks. That is, the feedback CQI is calculated under the assumption of a specific RI value. In general, the rank of a channel is changed slower than a CQI, and thus the RI is fed back by a smaller number of times than CQI. The transmission period of the RI may be a multiple of that of a CQI/PMI. The RI is given for the entire system band, and frequency selective RI feedback is not supported.

The CQI can be generated in various ways. For example, there are a method of quantizing a channel state without change and feeding the quantized channel state back, a method of calculating a Signal to Interference plus Noise Ratio (SINR) and feeding the calculated SINR back, and a method of informing a state in which the CQI is actually applied to a channel, such as a Modulation Coding Scheme (MCS).

If the CQI is generated based on the MCS, the MCS includes a modulation method, a coding method, and a corresponding coding rate. Accordingly, if the modulation method and the coding method are changed, the CQI has to be changed. Thus, at least one CQI per codeword is necessary.

If Multi Input Multi Output (MIMO) is applied to a wireless communication system, the number of necessary CQIs is changed. That is, an MIMO system can use a plurality of codewords because it generates multiple channels using multiple antennas. Accordingly, the number of corresponding CQIs has to be plural. If a plurality of CQIs is used, the amount of corresponding control information is increased proportionally.

Figure 6:
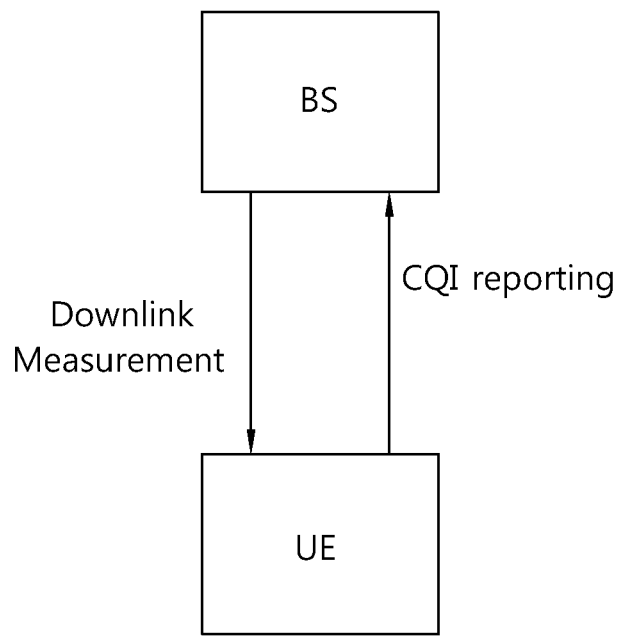
FIG. 6 is a conceptual diagram showing the generation and transmission of CQI.

FIG. 6 is a conceptual diagram showing the generation and transmission of CQI.

Referring to FIG. 6, UE measures a downlink channel state and reports a selected CQI value to a BS through an uplink control channel based on the measured downlink channel state. The BS performs downlink scheduling (UE selection, resource allocation, etc) according to the reported CQI. Here, the CQI value may be the SINR, Carrier to Interference and Noise Ratio (CINR), Bit Error Rate (BER), or Frame Error Rate (FER) value of the channel or a value converted from the SINR, the CINR, the BER, or the FER so that it can be transmitted. In the case of an MIMO system, the PMI, the RI, etc. in addition to the CQI can be added as CSI into which the channel state has been incorporated.

B) Characteristics in the Frequency Band of a CQI

In order to utilize a given channel capacity to a maximum in a wireless communication system, an MCS and transmission power are controlled according to a given channel through link adaptation. In order for a BS to perform this link adaptation, UE has to feed CSI back.

If a frequency band used by a wireless communication system has a bandwidth exceeding a coherence bandwidth, a channel suddenly changes within the bandwidth. In particular, if OFDM is used, several subcarriers are included in a given bandwidth and a modulated symbol is transmitted through each subcarrier. Thus, for optimal channel transmission, a channel state has to be incorporated into each subcarrier. To this end, several methods for reducing overhead due to a sudden increase in the amount of CSI feedback in a wireless communication system in which the number of subcarriers is plural have been proposed.

C) Scheme for Generating CQI

A method proposed in order to reduce overhead due to an increase in the amount of transmitted CSI (e.g., CQI) is described in brief.

First, there is a method of changing a unit of CSI transmitted. For example, there is a method of grouping several subcarriers into one subcarrier group and transmitting CSI, transmitted every subcarrier in an OFDM method, for each subcarrier group. For example, if 12 subcarriers are grouped into one subcarrier group in an OFDM method using 2048 subcarriers, a total of 171 subcarrier groups are formed. The amount of actually transmitted CSI is reduced from 2048 to 171.

If a frequency band is classified into an integer number of subcarriers as in an OFDM method, one subcarrier or a plurality of subcarriers are grouped into one subcarrier group, and the basic unit of a method of reporting each CQI for each subcarrier group is defined as a CQI subcarrier group or a CQI subband. Meanwhile, if a frequency band is not classified into each of subcarriers, the entire frequency band is classified into some frequency bands, CQI is generated based on the classified frequency band, and the frequency band classified in order to generate the CQI is defined as a CQI subband.

Second, there is a method of compressing CSI. For example, there is a method of compressing a CQI every subcarrier in an OFDM method and transmitting the compressed CQI. Methods, such as a Discrete Cosine Transform (DST), may be taken into consideration as the compression method.

Third, there is a method of selecting a frequency band and generating CSI. For example, in an OFDM method, there is a best-M method of selecting the best M (M is a natural number) subcarriers from subcarriers or a subcarrier group without transmitting channel information in each of all the subcarriers and transmitting channel information through the selected M subcarriers. When selecting a frequency band and transmitting a corresponding CQI, data that is actually transmitted can be basically divided into two parts. The first part is a CQI value part, and the second part is a CQI index part.

D) Scheme for Generating a Frequency Band Selective CQI

Figure 7:
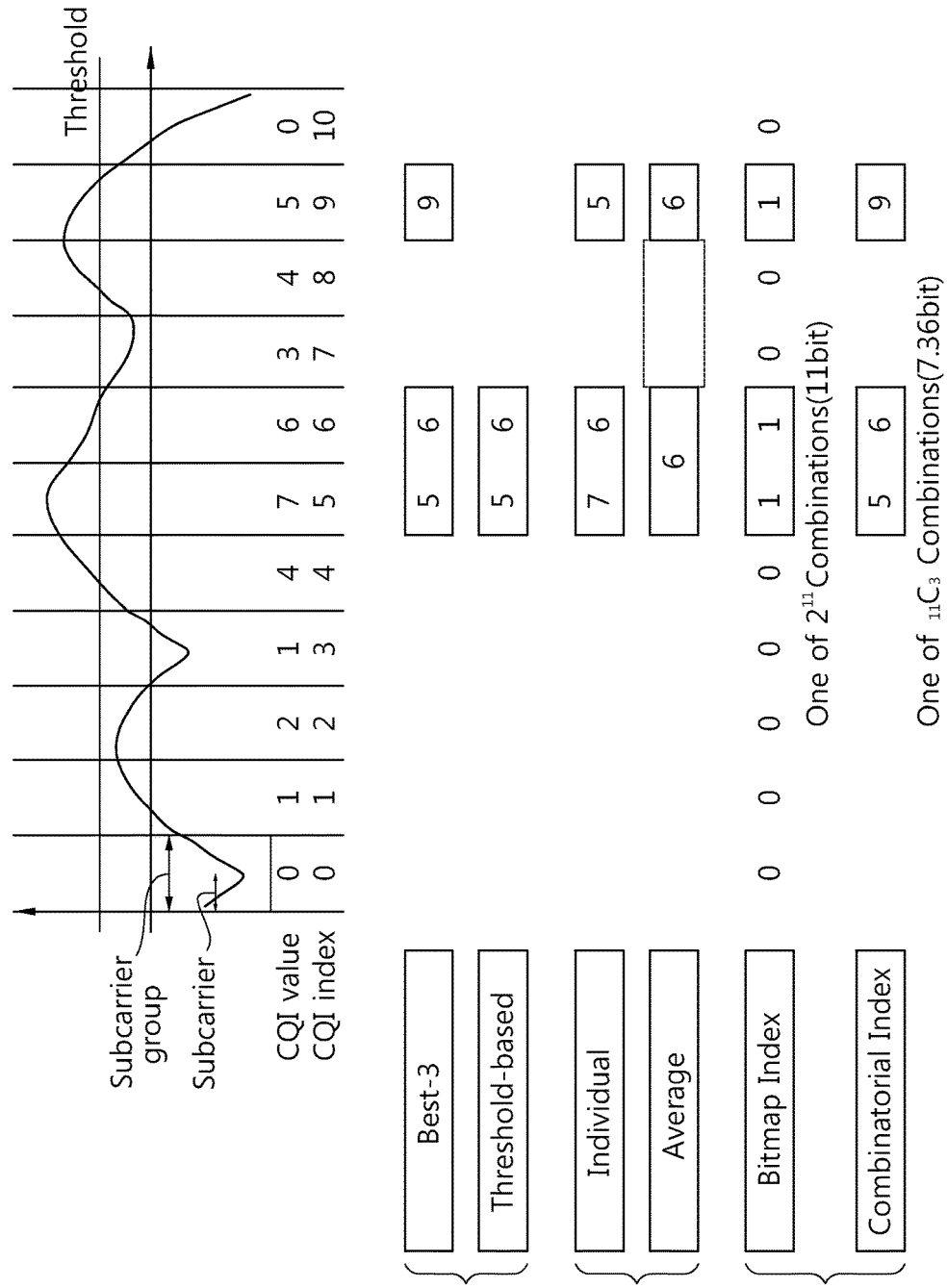
FIG. 7 shows schemes for selecting a CQI subband and generating CQI in the frequency domain.

FIG. 7 shows schemes for selecting a CQI subband and generating CQI in the frequency domain.

Referring to FIG. 7, the scheme for generating a frequency band selective CQI basically includes three parts. The first part is a method of selecting a frequency band in which a CQI will be generated, that is, a CQI subband. The second part is a method of manipulating and generating the CQI values of the selected frequency bands and transmitting the generated CQI values. The third part is a method of transmitting the selected frequency bands, that is, the indices of CQI subbands.

First, the method of selecting a CQI subband includes, for example, the best-M method and a threshold-based method. The best-M method is a method of selecting M CQI subbands having a good channel state. If the value of M is 3, three CQI subbands having index Nos. 5, 6, and 9 having a good channel state are selected. The threshold-based method is a method of selecting a CQI subband having a better channel state than a predetermined threshold. In this method, CQI subbands having index Nos. 5 and 6 higher than a threshold are selected in FIG. 7.

Second, the method of generating and transmitting CQI values includes, for example, an individual transmission method and an average transmission method. The individual transmission method is a method of transmitting all the CQI values of selected CQI subbands. Accordingly, in the individual transmission method, if the number of selected CQI subbands increases, the number of CQI values to be transmitted is increased. The average transmission method is a method of transmitting the mean of the CQI values of selected CQI subbands. Accordingly, the average transmission method is advantageous in that CQI values to be transmitted are united into one irrespective of the number of selected CQI subbands. In contrast, since the mean value of several CQI subbands is transmitted, there is a disadvantage in that accuracy is low. In the average transmission method, a method of simply calculating the mean may be a simple arithmetic average or may be the mean into which a channel capacity has been incorporated.

Third, the method of transmitting the index of a CQI subband includes, for example, a bitmap index method and a combinatorial index method. The bitmap index method is a method of allocating 1 bit to each of CQI subbands, allocating 1 to the 1 bit value of a specific CQI subband if the specific CQI subband is used, and allocating 0 to the 1 bit value of a specific CQI subband if the specific CQI subband is not used (of course, 0 may be allocated to the 1 bit value of a specific CQI subband if the specific CQI subband is used, and 1 may be allocated to the 1 bit value of a specific CQI subband if the specific CQI subband is not used) in order to indicate that what CQI subband is used. The bitmap index method requires the number of bits equal to a total number of CQI subbands, but can represent corresponding CQI subbands using a constant number of bits irrespective of how many CQI subbands are used. The combinatorial index method is a method of determining how many CQI subbands will be used and mapping the case of a combination equal to the number of CQI subbands used in a total number of CQI subbands to each index. For example, if a total of N CQI subbands are included and M (N and M are natural numbers and N is equal to or greater than M) CQI subband indices from among the N CQI subbands are used, a total number of possible combinations is calculated as in the following equation.

$$_NC_M = \frac{N!}{(N-M)!M!} \quad \text{[Equation 1]}$$

The number of bits for representing a total number of combinations as in Equation 1 is calculated as in the following equation.

$$\lceil \log_2(_NC_M) \rceil = \left\lceil \log_2\left(\frac{N!}{(N-M)!M!}\right) \right\rceil \quad \text{[Equation 2]}$$

The example of FIG. 7 corresponds to a method of selecting 3 CQI subbands from a total of 11 CQI subbands. Thus, a total number of possible combinations is $_{11}C_3$=165, and the number of bits for representing the 165 is 8 bits.

E) Increase of the Number of Transmitted CQIs in Several Dimensions

The number of CQIs can be increased in a variety of dimensions, resulting in increased overhead.

First, an increase of CQIs in the space dimension is described below. In MIMO, several codewords may be transmitted through several layers. Here, several CQIs are necessary. For example, in 3GPP LTE, a maximum of two codewords are possible in MIMO. Here, two CQIs are necessary. If one CQI consists of 4 bits and the number of codewords is 2, the CQI consists of a total of 8 bits. This CQI has to be transmitted by each MS which has to feed a channel state back. As a result, the CQIs occupy a large part from a viewpoint of all radio resources. Accordingly, it is preference that the number of CQIs is reduced to a minimum in terms of a channel capacity.

Second, an increase of CQIs in the frequency domain is described below. The above-described CQI is related to contents that correspond to one frequency band. If a receiver (UE) selects a frequency band having the best channel state and transmits only a CQI for the selected frequency band and a sender (BS) provides service through the selected frequency band, the CQI is necessary only in one frequency band. In this case, a more efficient method is necessary because the above method is suitable for a single user environment, but is not suitable for multiple users. When only a CQI for one preference frequency band is transmitted, there is no problem if frequency bands preferred by a plurality of users do not overlap with each other. If several users select a specific frequency band as a preference frequency band at the same time, a problem arises. In this case, users other than a selected user do not use the frequency band. If each user transmits only a CQI for one preference frequency band, users not selected by a BS are fundamentally precluded from an opportunity to be served. Accordingly, in order to solve this problem and effectively obtain a multi-user diversity gain, it is necessary to transmit a CQI for several frequency bands. If a CQI for several frequency bands is transmitted, the amount of transmitted CQI information is increased. For example, if three frequency bands having better channel states are sequentially selected and a CQI and frequency band indicator for each of the frequency bands are transmitted, the number of transmitted CQIs become three times, and additional transmission is necessary for indicators indicating the selected frequency bands.

Third, an increase of CQIs may be generated in a dimension into which both a space and a frequency are taken into consideration. That is, several CQIs may be necessary in the space dimension, and several CQIs may be necessary in the frequency domain.

Fourth, an increase of CQIs may be generated in other dimensions. For example, if a Code Division Multiple Access (CDMA) method is used, a CQI for each spread symbol may have to be taken into consideration because there is a change in the signal intensity, the amount of interference for each spread symbol. Accordingly, an increase of CQIs in the symbol dimension may be generated. In addition, an increase of CQIs in various dimensions may be generated.

In order to reduce the number of transmitted CQIs increasing as described above, a differential CQI (delta CQI) may be used.

F) Differential CQI

The cases where several CQIs are necessary in various dimensions have been described. If several CQIs are necessary as described above, a differential CQI may be used in order to reduce the number of transmitted CQIs. That is, one CQI, that is, a reference, is selected. Here, the reference CQI is normally transmitted, whereas only a difference between the reference CQI and other CQIs is transmitted. That is, a method similar to a differential modulation method in modulation and demodulation methods is used. Here, if several CQIs are indicated by a differential method, a large number of bits are allocated to the reference CQI value and a relatively small number of bits are allocated to other CQI values so that the number of transmitted CQIs is reduced.

G) CQI Transmission Mode

Uplink channels used to transmit a CQI in a 3GPP LTE system are shown in Table 1 below.

TABLE 1

| SCHEDULING METHOD | PERIODIC CQI TRANSMISSION | APERIODIC CQI TRANSMISSION |
|---|---|---|
| FREQUENCY NON-SELECTIVE | PUCCH | |
| FREQUENCY SELECTIVE | PUCCH | PUSCH |

As shown in Table 1, a CQI may be transmitted through a PUCCH in the period that is determined by a higher layer or may be transmitted through a PUSCH aperiodically according to the necessity of a scheduler. If a CQI is transmitted through a PUSCH, it is possible only in a frequency selective scheduling method.

1) Transmission of CQI/PMI/RI through a PUSCH after receiving a CQI transmission request signal (CQI request)

In this case, a control signal (CQI request) that requests to transmit a CQI is included in a PUSCH scheduling control signal (UL grant) transmitted through a PDCCH. Table 2 below illustrates mode when a CQI/PMI/RI are transmitted through a PUSCH.

TABLE 2

| | | PMI Feedback Type | | |
|---|---|---|---|---|
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

Transmission mode in Table 2 may be indicated by a higher layer signal that is transmitted by a BS, and all CQI/PMI/RI may be transmitted through the PUSCH of the same subframe. Mode 1-2, mode 2-0, mode 2-2, mode 3-0, and mode 3-1 in Table 2 are described below.

1-1) Mode 1-2

A precoding matrix is selected assuming that data is transmitted only through a corresponding subband in relation to each subband. UE generates a CQI under the assumption of a precoding matrix selected in relation to a system band or a band designated by a higher layer signal (this is called a band set S).

The UE transmits the CQI and the PMI value of each subband. Here, the size of each subband may differ depending on the size of a system band.

1-2) Mode 2-0

UE selects M preference subbands for a system band or a band (band set S) that has been designated by a higher layer signal. The UE generates one CQI value assuming that data has been transmitted in the selected M subbands. The UE additionally generates one CQI (a broadband CQI) value for the system band or the band set S.

If there is a plurality of codewords for the selected M subbands, a CQI value for each codeword is defined in a differential form. The differential CQI=an index corresponding to the CQI value for the selected M subbands-the broadband CQI index.

The UE transmits information on the positions of the selected M subbands, the one CQI value for the selected M subbands, and the CQI value generated for the system band or the band set S. Here, the size of the subband and the M value may be different depending on the size of the system band.

1-3) Mode 2-2

UE selects the positions of M preference subbands and a single precoding matrix for the M preference subband at the same time assuming that data is transmitted through the M preference subbands.

A CQI value for the M preference subbands is defined for each codeword. The UE additionally generates a broadband CQI value for the system band or the band set S.

The UE transmits the information on the positions of the M preference subbands, the one CQI value for the selected M subbands, a single Precoding Matrix Index (PMI) for the M preference subbands, a broadband precoding matrix index, and the broadband CQI value. Here, the size of the subband and the M value may be different depending on the size of the system band.

1-4) Mode 3-0

UE generates a broadband CQI value. The UE generates a CQI value for each subband assuming that data is transmitted through each subband. Here, although RI>1, the CQI value has only a CQI value for the first codeword.

1-5) Mode 3-1

A single precoding matrix for a system band or a band set S is generated. UE generates a CQI for a subband for each codeword under the assumption of the above-described single precoding matrix generated for each subband. The UE can generate a broadband CQI under the assumption of a single precoding matrix.

The CQI value of each subband is represented in a differential form. That is, 'the subband CQI=a subband CQI index-broadband CQI index'. The size of the subband may be different depending on the size of a system band.

2) Periodic Transmission of a CQI/PMI/RI Through a PUCCH

A CQI may be periodically transmitted through a PUCCH or through a PUSCH according to circumstances. Although a CQI is transmitted through a PUSCH, the contents of the CQI/PMI/RI are generated according to one of modes defined in Table 3.

TABLE 3

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

In Table 3, in case of mode 2-0 and mode 2-1, a corresponding Bandwidth Part (BP) is a set of consecutively located subbands, and it may cover both a system band or a band set S. The size of each subband, the size of the BP, and the number of BPs may be different depending on the size of a system band. Furthermore, CQIs are transmitted in ascending powers for each BP in the frequency domain so that the system band or the band set S can be covered.

There may be four transmission types as follows according to a transmission combination of a CQI/PMI/RI: type 1: mode 2-0, a subband CQI (SB-CQI) of mode 2-1 is transmitted. type 2: a broadband CQI and a PMI (WB-CQI/PMI) are transmitted. type 3: an RI is transmitted. type 4: a broadband CQI is transmitted.

If an RI and a broadband CQI/PMI are transmitted, they are transmitted in subframes having different periods and offsets. If the RI and the broadband CQI/PMI are configured so that they are transmitted in the same subframe, the CQI/PMI are not transmitted.

The period of each of a broadband CQI/PMI and a subband CQI is P, and it has the following characteristics.

The broadband CQI/PMI has the period of H*P. Here, H=J*K+1, J is the number of frequency bands, and K is a total cycle number of frequency bands. That is, the broadband CQI/PMI is transmitted in {0, H, 2H, . . . }. The subband CQI is transmitted in points of time J*K other than a point of time at which the broadband CQI/PMI are transmitted.

The period of the RI is M times the period of the broadband CQI/PMI, and it has the following characteristics. The offset of each of the RI and the broadband CQI/PMI is O. If the RI and the broadband CQI/PMI are transmitted in the same subframe, the broadband CQI/PMI are not transmitted.

All the above-described parameters P, H, K, and O are determined in a higher layer and signalized.

Each mode of Table 3 is described.

2-1) Mode 1-0

If an RI is transmitted, the RI is generated for a system band or a band set S and a type 3 report is transmitted. IF a CQI is transmitted, a broadband CQI is transmitted.

2-2) Mode 1-1

If an RI is transmitted, the RI is generated for a system band or a band set S and a type 3 report is transmitted. IF a CQI/PMI are transmitted, a single precoding matrix is selected under the assumption of the most recently transmitted RI. A type 2 report consisting of a broadband CQI, the single precoding matrix, and a differential broadband CQI is transmitted.

2-3) Mode 2-0

If an RI is transmitted, the RI is generated for a system band or a band set S and a type 3 report is transmitted. If a broadband CQI is transmitted, a broadband CQI is generated under the assumption of the most recently transmitted RI, and a type 4 report is transmitted. If a CQI for a selected subband is transmitted, UE selects the most preferred subband for J BPs including N subbands and transmits the type 1 report. The type 1 report may require one or more subframes depending on a BP.

2-4) Mode 2-1

If an RI is transmitted, the RI is generated for a system band or a band set S and the type 3 report is transmitted. If a broadband CQI is transmitted, a broadband CQI is generated under the assumption of the most recently transmitted RI, and the type 4 report is transmitted. If a CQI for selected subbands is transmitted, UE generates a single CQI value for the selected subbands within a BP under the assumption of the most recently transmitted PMI/RI in relation to $N_j$ J BPs and a difference between the CQIs of codewords assuming that the most recently transmitted RI and a single precoding matrix have been used in the selected subbands when the RI is greater than 1 and transmits the type I report.

For the contents described with reference to Tables 1 to 3, reference can be made to section 7.2 of '3GPP TS 36.213 V8.7.0 (2009-05)'.

A multi-carrier system is described below.

Figure 8:
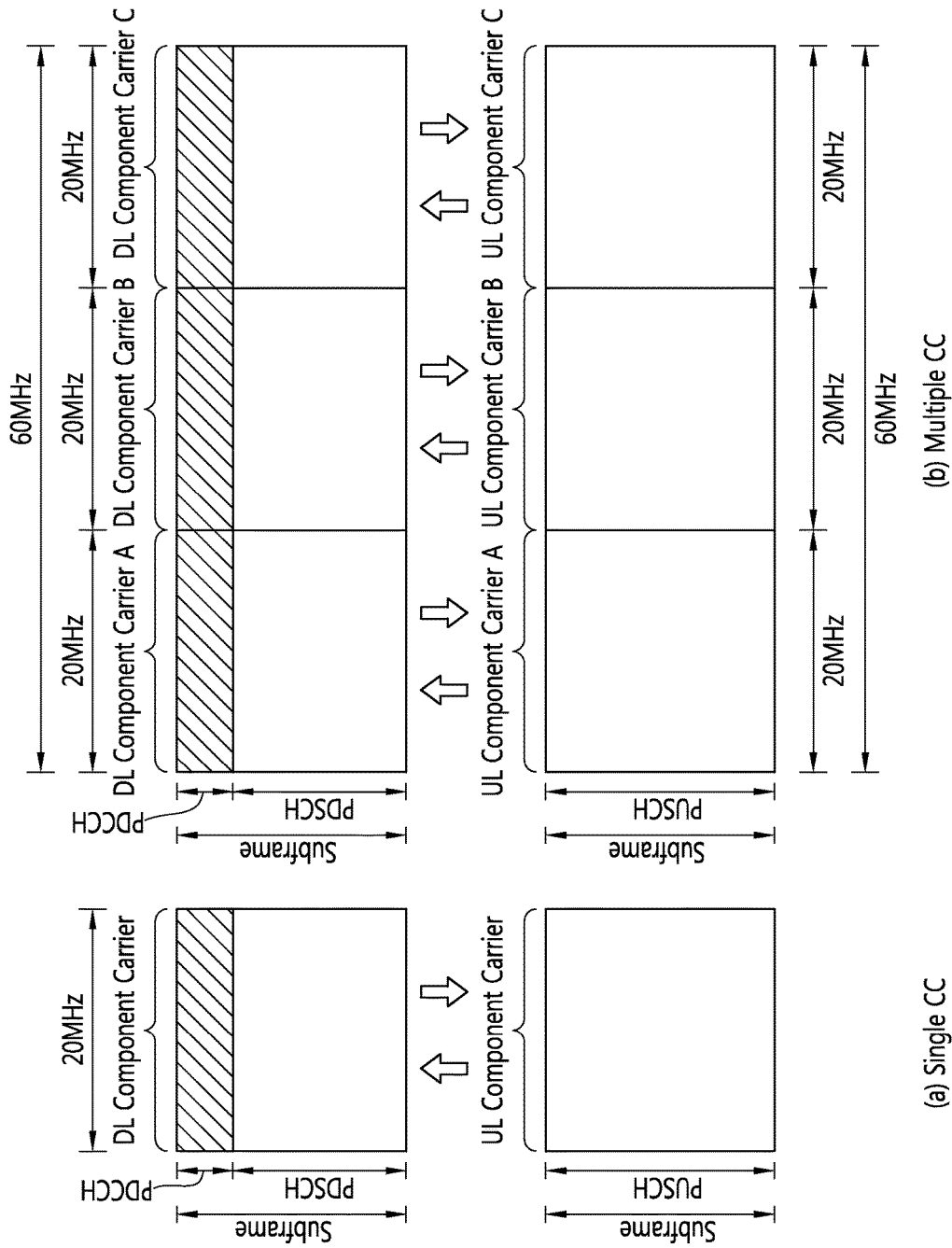
FIG. 8, including (a) and (b), shows an example of a comparison between the existing single carrier system and a multi-carrier system.

FIG. 8, including (a) and (b), shows an example of a comparison between the existing single carrier system and a multi-carrier system.

Referring to FIG. 8(a), in the single carrier system, only one carrier is supported for an MS in uplink and downlink. The bandwidth of a carrier may be various, but the number of carriers allocated to an MS is one. In contrast, in the multi-carrier system, a plurality of CCs (DL CCs A to C and UL CCs A to C) can be allocated to an MS. For example, in order to allocate a bandwidth of 60 MHz to an MS, 3 CCs each having 20 MHz may be allocated to the MS.

Referring to FIG. 8(b), the multi-carrier system may be divided into a contiguous CA system in which aggregated carriers are contiguous to each other and a non-contiguous CA system in which aggregated carriers are spaced apart from each other. When a multi-carrier system is simply said hereinafter, it is to be understood that the multi-carrier system includes both a case where CCs are contiguous to each other and a case where CCs are not contiguous to each other.

A CC, that is, a target when aggregating one or more CCs may use bandwidths used in the existing system for the purpose of backward compatibility with the existing system. For example, a 3GPP LTE system supports bandwidths of 1.4 MHz, 3 MHz, 5 MHz, 10 MHz, 15 MHz, and 20 MHz. A 3GPP LTE-A system can configure a broadband of 20 MHz or higher using only the bandwidths of the 3GPP LTE system. Or, a 3GPP LTE-A system may configure a broadband by defining new bandwidths without using the bandwidths of the existing system.

The system band of a wireless communication system is classified into a plurality of carrier frequencies. Here, the carrier frequency means the center frequency of a cell. Hereinafter, a cell may mean downlink frequency resources and uplink frequency resources. Or, a cell may mean a combination of downlink frequency resources and optional uplink frequency resources. Furthermore, in general, if a CA is not taken into consideration, one cell may always include uplink and downlink frequency resources that form a pair. In order for packet data to be transmitted and received through a specific cell, an MS first has to complete a configuration for the specific cell. Here, the configuration means a state in which the reception of system information necessary to transmit and receive data to and from the specific cell has been completed. For example, the configuration may include an overall process of receiving common physical layer parameters necessary for the transmission/reception of data, MAC layer parameters, or parameters necessary for a specific operation in the RRC layer. A configuration-completed cell is in a state in which the cell can immediately transmit and receive packet data only it has only to receive information about which the packet data can be transmitted.

A cell of a configuration-completed state may be in an activation or deactivation state. Here, the activation refers to a state in which data is being transmitted or received or a state in which data is ready to be transmitted or received. An MS can monitor and receive the control channel (PDCCH)

and data channel (PDSCH) of an activated cell in order to check resources (they may be the frequency, the time, etc.) allocated thereto.

Deactivation refers to a state in which traffic data cannot be transmitted or received, but measurement or the transmission/reception of minimum information are possible. An MS can receive necessary System Information (SI) in order to receive packets from a deactivated cell. In contrast, the MS does not monitor or receive the control channel (PDCCH) and data channel (PDSCH) of a deactivated cell in order to check resources (they may be a frequency, time, etc.) allocated thereto.

A cell may be classified into a primary cell, a secondary cell, and a serving cell.

The primary cell means a cell that operates in a primary frequency, a cell in which an MS performs an initial connection establishment procedure or a connection re-establishment procedure with a BS, or a cell that is indicated as a primary cell in a handover process. The secondary cell means a cell that operates in a secondary frequency. The secondary cell is configured once RRC establishment is set up and used to provide additional radio resources.

The serving cell is formed of a primary cell in the case of an MS in which a Carrier Aggregation (CA) has not been configured or to which a CA cannot be provided. If a CA has been configured for an MS, the term 'serving cell' is used to indicate a primary cell and one of all secondary cells or a set of a plurality of secondary cells. That is, a primary cell means one serving cell which provides security inputs and NAS mobility information in an RRC establishment or re-establishment state. At least one cell may be configured to form a set of serving cells along with a primary cell depending on the capabilities of UE. The at least one cell is called a secondary cell. Accordingly, a set of serving cells configured for one MS may be formed of only one primary cell or may be formed of one primary cell and at least one secondary cell.

A Primary Component Carrier (PCC) means a Component Carrier (CC) corresponding to a primary cell. A PCC is a CC through which an MS forms connection or RRC connection with a BS at the early stage from among some CCs. A PCC is a special CC that is responsible for connection or RRC connection for signaling regarding a plurality of CCs and that manages UE context, that is, connection information related to an MS. Furthermore, a PCC is always in the activation state when it is in RRC connected mode after forming connection or RRC connection with an MS.

A Secondary Component Carrier (SCC) means a CC corresponding to a secondary cell. That is, an SCC is a CC allocated to an MS in addition to a PCC and is a carrier extended for additional resource allocation, etc. by an MS in addition to a PCC. An SCC may be divided into the activation or deactivation state.

A downlink CC (DL CC) corresponding to a primary cell is called a downlink Primary Component Carrier (DL PCC), and an uplink CC (UL CC) corresponding to a primary cell is called an uplink Primary Component Carrier (UL PCC). Furthermore, in downlink, a CC corresponding to a secondary cell is called a downlink Secondary Component Carrier (DL SCC). In uplink, a CC corresponding to a secondary cell is called an uplink Secondary Component Carrier (UL SCC).

A primary cell and a secondary cell have the following characteristics.

First, a primary cell is used to transmit a PUCCH. Second, a primary cell is always activated, whereas a secondary cell is a carrier that is activated or deactivated according to specific conditions. Third, when a primary cell experiences a Radio Link Failure (hereinafter referred to as an RLF), RRC re-establishment is triggered, or a secondary cell experiences an RLF, RRC re-establishment is not triggered. Fourth, a primary cell may be changed by a change of a security key or by a handover procedure that is accompanied by a random access channel (RACH) procedure. Fifth, Non-Access Stratum (NAS) information is received through a primary cell. Sixth, a primary cell is always formed of a pair of a DL PCC and an UL PCC. Seventh, a different CC may be configured as a primary cell in each MS. Eighth, procedures, such as the reconfiguration, addition, and removal of a primary cell, can be performed by the RRC layer. In adding a new secondary cell, RRC signaling may be used to transmit system information about a dedicated secondary cell.

A DL CC may form one serving cell, or a DL CC and an UL CC may form one serving cell through connection establishment. However, a serving cell is not formed of only one UL CC. The activation/deactivation of a CC has the same concept as the activation/deactivation of a serving cell. For example, assuming that a serving cell1 is formed of a DL CC1, the activation of the serving cell1 means the activation of the DL CC1. Assuming that a serving cell2 is configured through connection establishment of a DL CC2 and an UL CC2, the activation of the serving cell2 means the activation of the DL CC2 and the UL CC2. In this sense, each CC may correspond to a cell.

The number of CCs that are aggregated between downlink and uplink may be differently set. A case where the number of aggregated DL CCs is the same as the number of aggregated UL CCs is called a symmetric aggregation, and a case where the number of aggregated DL CCs is different from the number of aggregated UL CCs is called an asymmetric aggregation. Furthermore, the CCs may have different sizes (i.e., bandwidths). For example, assuming that 5 CCs are used to form a 70 MHz band, the 70 MHz band may be configured like 5 MHz CC (carrier #0)+20 MHz CC (carrier #1)+20 MHz CC (carrier #2)+20 MHz CC (carrier #3)+5 MHz CC (carrier #4).

As described above, unlike a single carrier system, a multi-carrier system can support a plurality of Component Carriers (CCs). That is, one MS can receive a plurality of PDSCHs through a plurality of DL CCs.

A multi-carrier system can support cross-carrier scheduling. Cross-carrier scheduling is a scheduling method capable of performing the resource allocation of a PDSCH transmitted through other CCs and/or the resource allocation of a PUSCH transmitted through CCs other than CCs that is basically linked to a specific CC, through a PDCCH transmitted through the specific CC. That is, a PDCCH and a PDSCH may be transmitted through different DL CCs, and a PUSCH can be transmitted through UL CCs other than an UL CC that is linked to a DL CC on which a PDCCH including an UL grant has been transmitted. As described above, a system which supports cross-carrier scheduling requires a carrier indicator for informing that a PDSCH/PUSCH that a PDCCH provides control information are transmitted through what DL CC/UL CC. A field including this carrier indicator is hereinafter called a Carrier Indicator Field (CIF).

A multi-carrier system which supports cross-carrier scheduling may include a CIF in a conventional Downlink Control Information (DCI) format. In a system which supports cross-carrier scheduling, for example, LTE-A system, 1 to 3 bits can be extended because a CIF is added to the existing DCI format (i.e., a DCI format used in LTE). The PDCCH structure may reuse the existing coding method and resource allocation method (i.e., resource mapping based on a CCE).

Figure 9:
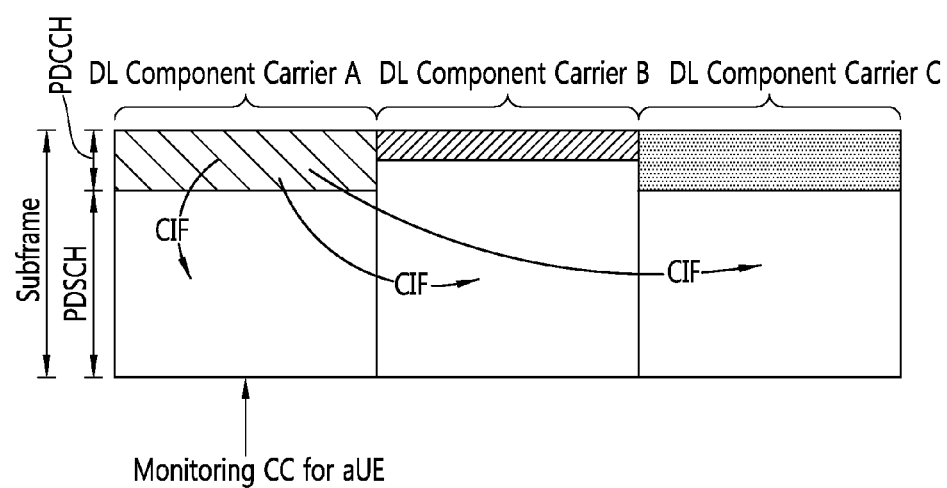
FIG. 9 illustrates the structure of a subframe for cross-carrier scheduling in a multi-carrier system.

FIG. 9 illustrates the structure of a subframe for cross-carrier scheduling in a multi-carrier system.

Referring to FIG. 9, a BS may configure a PDCCH monitoring DL CC set. The PDCCH monitoring DL CC set includes some of all aggregated DL CCs. When cross-carrier scheduling is configured, an MS performs PDCCH monitoring/decoding on only DL CCs that are included in a PDCCH monitoring DL CC set. In other words, a BS transmits a PDCCH for a PDSCH/PUSCH to be scheduled through DL CCs that are included in a PDCCH monitoring DL CC set. A PDCCH monitoring DL CC set may be configured in a UE-specific, UE group-specific, or cell-specific way.

FIG. 9 shows an example in which 3 DL CCs DL CC A, DL CC B, and DL CC C) are aggregated and the DL CC A has been set as a PDCCH monitoring DL CC. An MS can receive DL grants for the PDSCHs of the DL CC A, the DL CC B, and the DL CC C through the PDCCH of the DL CC A. DCI that is transmitted through the PDCCH of the DL CC A includes a CIF, and thus it can indicate that the DCI is DCI for what DL CC.

A method of transmitting CSI in a multi-carrier system is described below.

Figure 10:
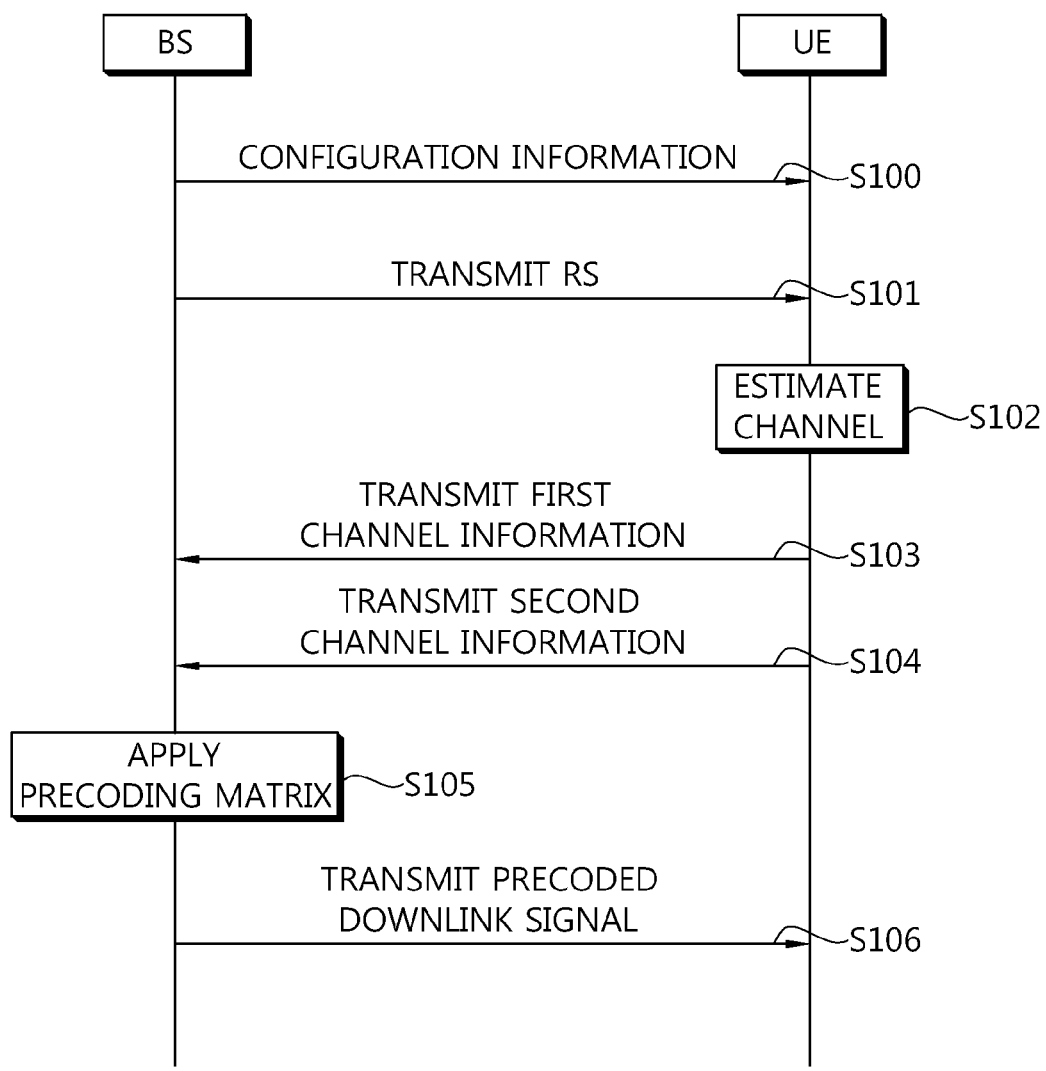
FIG. 10 shows a method of transmitting CSI in accordance with an embodiment of the present invention.

FIG. 10 shows a method of transmitting CSI in accordance with an embodiment of the present invention.

Referring to FIG. 10, a BS transmits configuration information to UE (S100). The configuration information includes scheduling information on Channel Status Information (CSI) that is fed back from the UE to the BS. For example, the configuration information may include a configuration index for feedbacks, such as a CQI, a PMI, and an RI. The UE can know the transmission period of the CSI and subframe offset information through the configuration index.

The BS transmits a reference signal to the UE (S101). For example, the BS may transmit a Channel Status Information-Reference Signal (CSI-RS) to the UE using a maximum of 8 antenna ports. That is, the downlink transmission mode of the BS may be the above-described transmission mode 9.

The UE receives the reference signal and estimates a channel with the BS based on the received reference signal (S102). The UE transmits first channel information to the BS (S103) and transmits second channel information (S104). Here, the first channel information and the second channel information are pieces of CSI, and the first channel information and the second channel information may be combined in order to indicate a channel state. For example, the second channel information is information that particularly specifies the first channel information, and one PMI may be indicated using both the first channel information and the second channel information.

An application example is described below. The first channel information may include CSI on a band wider than that of the second channel information. That is, the first channel information may include a PMI for the entire system band, and the second channel information may include a PMI for the subbands of the system band.

Furthermore, the first channel information may be transmitted in a first period, and the second channel information may be transmitted in a second period. The first period and the second period may be identical with each other, or the first period may be greater than the second period. That is, the first channel information and the second channel information may be transmitted at the same time, and the second channel information may be transmitted more frequently than the first channel information.

A detailed example in which one PMI is obtained by combining the second channel information and the first channel information is described below. For example, for the purpose of a PMI feedback, codebooks, such as Tables 5 to 12 below, may be used. In Tables 5 to 12 below, $\phi_n$ and $v_m$ are given as in Table 4 below.

TABLE 4

$$\phi_n = e^{j\pi n/2}$$
$$v_m = [1 \ e^{j2\pi m/32} \ e^{j4\pi m/32} \ e^{j6\pi m/32}]^T$$

A codebook that is used by UE in order to report 1-layer CSI using the antenna ports 15 to 22 is given as in Table 5 below.

TABLE 5

| $i_1$ | $i_2$ | | | | |
|---|---|---|---|---|---|
| | 0 | 1 | 2 | 3 | 4 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ |

| $i_1$ | $i_2$ | | | | |
|---|---|---|---|---|---|
| | 5 | 6 | 7 | 8 | 9 |
| 0-15 | $W_{2i_1+1,1}^{(1)}$ | $W_{2i_1+1,2}^{(1)}$ | $W_{2i_1+1,3}^{(1)}$ | $W_{2i_1+2,0}^{(1)}$ | $W_{2i_1+2,1}^{(1)}$ |

| $i_1$ | $i_2$ | | | | |
|---|---|---|---|---|---|
| | 10 | 11 | 12 | 13 | 14 |
| 0-15 | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ |

| | $i_2$ |
|---|---|
| $i_1$ | 15 |
| 0-15 | $W_{2i_1+3,3}^{(1)}$ | where $W_{m,n}^{(1)} = \frac{1}{\sqrt{8}} \begin{bmatrix} v_m \\ \phi_n v_m \end{bmatrix}$ In Table 5, $i_1$ may be the first channel information (i.e., a first PMI), and $i_2$ may be the second channel information (i.e., a second PMI). That is, the BS cannot specify a detailed PMI using only the first channel information transmitted by the UE, but can know a detailed PMI through the second channel information. In other words, one PMI can be specified using a method of indicating one or more precoding matrices through the first channel information and indicating any one of the one or more precoding matrices, indicated by the first channel information, through the second channel information.

A codebook that is used by UE in order to report 2-layer CSI using the antenna ports 15 to 22 is given as in Table 6 below.

TABLE 6

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| | $i_2$ | | | |
| $i_1$ | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| | $i_2$ | | | |
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| | $i_2$ | | | |
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4}\begin{bmatrix} v_m & v_{m'} \\ \phi_n v_m & -\phi_n v_{m'} \end{bmatrix}$ A codebook that is used by UE in order to report 3-layer CSI using the antenna ports 15 to 22 is given as in Table 7 below.

TABLE 7

| $i_1$ | $i_2$ | | |
|---|---|---|---|
| | 0 | 1 | 2 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ |
| | $i_2$ | | |
| $i_1$ | 3 | 4 | 5 |
| 0-3 | $\tilde{W}_{8i_1+8,8i_1,8i_1}^{(3)}$ | $W_{8i_1+2,8i_1+2,8i_1+10}^{(3)}$ | $W_{8i_1+10,8i_1+2,8i_1+10}^{(3)}$ |
| | $i_2$ | | |
| $i_1$ | 6 | 7 | 8 |
| 0-3 | $\tilde{W}_{8i_1+2,8i_1+10,8i_1+10}^{(3)}$ | $\tilde{W}_{8i_1+10,8i_1+2,8i_1+2}^{(3)}$ | $W_{8i_1+4,8i_1+4,8i_1+12}^{(3)}$ |
| | $i_2$ | | |
| $i_1$ | 9 | 10 | 11 |
| 0-3 | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |
| | $i_2$ | | |
| $i_1$ | 12 | 13 | 14 |

TABLE 7-continued

| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ |
|---|---|---|---|
| | | | $i_2$ |
| | | $i_1$ | 15 |
| | | 0-3 | $\tilde{W}_{8i_1+14,8i_1+6,8i_1+6}^{(3)}$ | where $W_{m,m',m''}^{(3)} = \frac{1}{\sqrt{24}}\begin{bmatrix} v_m & v_{m'} & v_{m''} \\ v_m & -v_{m'} & -v_{m''} \end{bmatrix}$, $\tilde{W}_{m,m',m''}^{(3)} = \frac{1}{\sqrt{24}}\begin{bmatrix} v_m & v_{m'} & v_{m''} \\ v_m & v_{m'} & -v_{m''} \end{bmatrix}$ A codebook that is used by UE in order to report 4-layer CSI using the antenna ports 15 to 22 is given as in Table 8 below.

TABLE 8

| $i_1$ | $i_2$ | | | |
|---|---|---|---|---|
| | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |
| | $i_2$ | | | |
| $i_1$ | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ | where $W_{m,m',n}^{(4)} = \frac{1}{\sqrt{32}}\begin{bmatrix} v_m & v_{m'} & v_m & v_{m'} \\ \phi_n v_m & \phi_n v_{m'} & -\phi_n v_m & -\phi_n v_{m'} \end{bmatrix}$ A codebook that is used by UE in order to report 5-layer CSI using the antenna ports 15 to 22 is given as in Table 9 below.

TABLE 9

| | $i_2$ |
|---|---|
| $i_1$ | 0 |
| 0-3 | $W_{i_1}^{(5)} = \frac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

A codebook that is used by UE in order to report 6-layer CSI using the antenna ports 15 to 22 is given as in Table 10 below.

TABLE 10

| | $i_2$ |
|---|---|
| $i_1$ | 0 |
| 0-3 | $W_{i_1}^{(6)} = \frac{1}{\sqrt{48}}\begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

A codebook that is used by UE in order to report 7-layer CSI using the antenna ports 15 to 22 is given as in Table 11 below.

TABLE 11

| $i_1$ | $i_2$ |
| --- | --- |
|   | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

A codebook that is used by UE in order to report 8-layer CSI using the antenna ports 15 to 22 is given as in Table 12 below.

TABLE 12

| $i_1$ | $i_2$ |
| --- | --- |
|   | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

As described above with reference to Tables 4 to 12, the UE feeds the first channel information and the second channel information back to the BS. Here, the second channel information may be considered as information that particularly specifies the first channel information. In the above example, a case where the second channel information indicates one precoding matrix of a set of precoding matrices indicated by the first channel information has been illustrated as an example in which the first channel information and the second channel information are combined and used, but the present invention is not limited thereto. A PMI for a downlink channel may be provided using another method of combining the first channel information and the second channel information.

Referring back to FIG. 10, the BS determines a precoding matrix to be used when performing MIMO transmission to the UE using the first channel information and the second channel information (S105). Next, the BS transmits a downlink signal to the UE by applying the determined precoding matrix (S106).

If a plurality of component carriers is aggregated and used in downlink in a multi-carrier system, UE can generate and report the first channel information and the second channel information for each component carrier. Or, UE can generate and report the first channel information and the second channel information for all of a plurality of component carriers not each component carrier. Or, UE can feed back channel information by combining the two types of methods. For example, UE can individually generate the first channel information and the second channel information for a specific one of a plurality of component carriers, generate the first channel information and the second channel information for the remaining component carriers, and report them.

Meanwhile, an RI may be signalized separately from the first channel information and the second channel information or may be implicitly informed through the first channel information.

In the above method of transmitting CSI, if the UE does not transmit the first channel information, but transmits only the second channel information, there may be a problem in which the BS cannot determine a detailed PMI. The UE may transmit the CSI through a PUCCH or a PUSCH. Here, the UE may drop the transmission of specific CSI. For example, the UE may be configured so that it transmits the first channel information through the PUCCH of a first subframe and transmits the second channel information through the PUCCH of a second subframe. If the number of bits of ACK/NACK that have to be transmitted through the PUCCH of the first subframe is many, the UE may have to drop the transmission of the first channel information and to transmit only the ACK/NACK. In this case, the first channel information is not transmitted, and only the second channel information is transmitted to the BS. In this case, how the BS will specify a precoding matrix preferred by the UE may be problematic. A method of solving this problem is described below.

Method 1

If the transmission of first channel information (e.g., a first PMI) is dropped in a specific subframe, UE may generate and transmit second channel information (e.g., a second PMI) under the assumption of the first channel information that has most recently been transmitted before the specific subframe in a section until a subframe in which the first channel information has to be subsequently transmitted.

Figure 11:
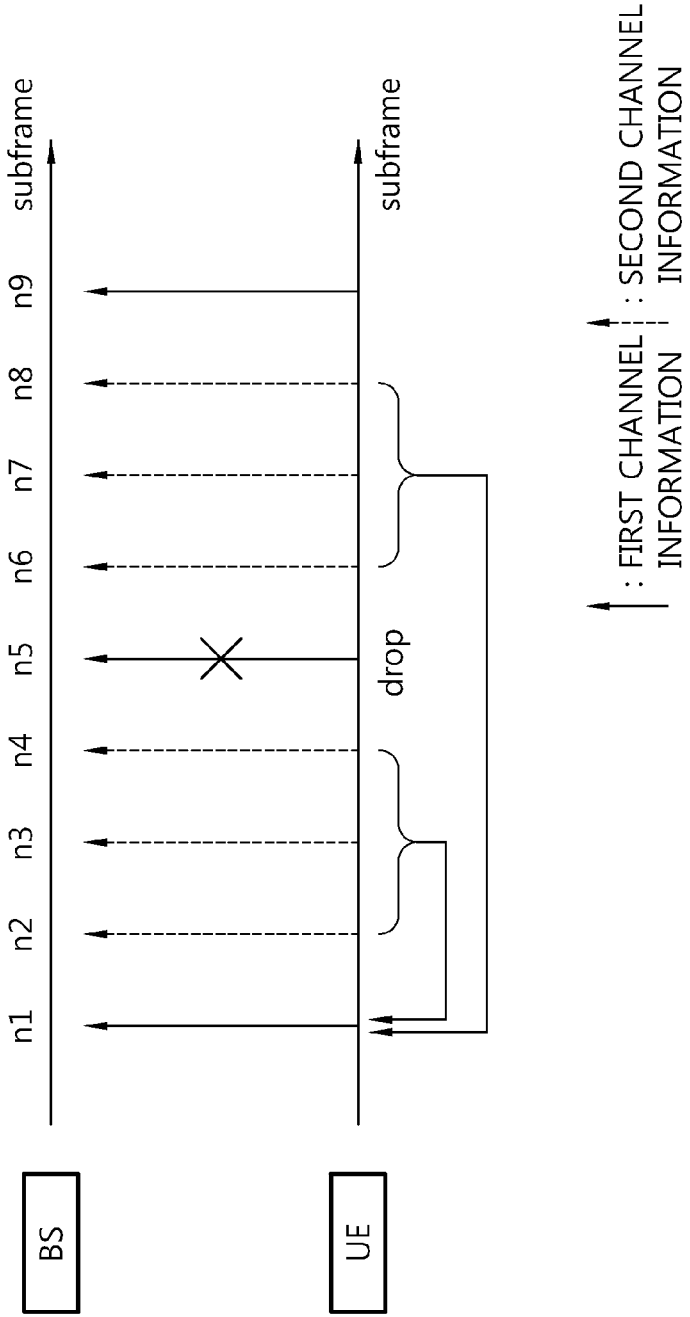
FIG. 11 illustrates a method 1.

FIG. 11 illustrates the method 1.

Referring to FIG. 11, the first PMI may be configured so that the first PMI is transmitted in a subframe n1, a subframe n5, and a subframe n9, and the second PMI may be configured so that the second PMI is transmitted in a subframe n2, a subframe n3, a subframe n4, a subframe n6, a subframe n7, and a subframe n8. For example, the transmission period of the first PMI may be 20 ms, and the transmission period of the second PMI may be 5 ms. Here, although the UE has transmitted the first PMI in the subframe n1, the UE may drop the transmission of the first PMI in the subframe n5. In this case, the UE generates the second PMI, transmitted in a section from the subframe n6 to the subframe n8, under the assumption of the first PMI transmitted in the subframe n1.

If the first PMI is not received in a subframe in which the reception of the first PMI has been scheduled (e.g., the subframe n5), a BS determines a precoding matrix to be used for MIMO transmission using the first PMI that has most recently been received (i.e., the first PMI received in the subframe n1) and the second PMI at points of time at which it will has been received (i.e., the second PMI received in the subframe n6 to the subframe n8).

In a multi-carrier system, if UE transmits the first channel information and the second channel information for a plurality of DL CCs, when the UE drops the transmission of the first channel information for a specific DL CC, the UE generate the second channel information for the specific DL CC based on the first channel information that has most recently been transmitted for the specific DL CC and transmit the generated second channel information.

In the above example, a CQI may be generated and transmitted based on a PMI when the first PMI that has most recently been transmitted by the UE and the second PMI at points of time at which it is scheduled to be transmitted by the UE are combined. The CQI may include an SNR, an SNIR, or a preferred MCS.

Method 2

If UE drops the transmission of first channel information in a subframe in which the first channel information has been scheduled to be transmitted, the UE may transmit second channel information which can independently derive a PMI until a subframe in which the transmission of the first channel information has been subsequently scheduled.

Figure 12:
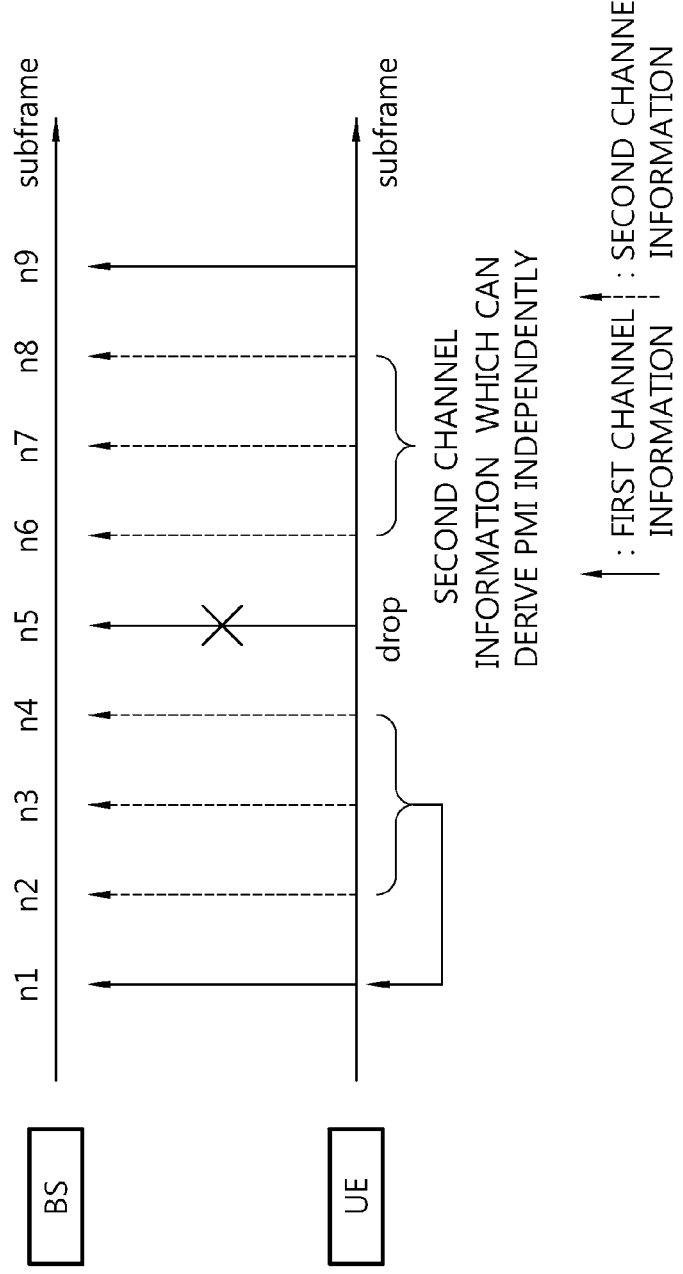
FIG. 12 illustrates a method 2.

FIG. 12 illustrates the method 2.

Referring to FIG. 12, the UE may be configured so that it transmits the second channel information in subframes n2 to n4 and n6 to n8 so that it transmits the first channel information in subframes n1, n5, and n9. The UE may drop the transmission of the first channel information in the subframe n5 in which the transmission of the first channel information has been scheduled. Thus, the UE may generate the second channel information transmitted in the subframes n6 to n8 so that a PMI is independently derived without being based on the first channel information and transmit the second channel information. For example, if information of 8 bits is necessary to specify the PMI, the first channel information transmitted in the subframe n1 by the UE may provide the first PMI of 4 bits, and the second channel information transmitted in the subframes n2 to n4 by the UE may provide the second PMI of 4 bits.

In contrast, the second channel information transmitted in the subframes n6 to n8 may provide the second PMI of 8 bits. Thus, a BS can identify a specific PMI using the first PMI and the second PMI in the section of the subframes n1 to n4, but identify a specific PMI using only the second PMI in the section of the subframes n6 to n8. Here, a CQI is generated based on a PMI into which the second PMI that has most recently been transmitted has been incorporated and transmitted. The CQI may include information such as an SNR, an SINR, and an MCS.

Method 3

If UE drops the transmission of first channel information in a subframe in which the first channel information has been scheduled to be transmitted, the UE may transmit the first channel information at the next point of time at which second channel information will be subsequently transmitted. Or, the UE may transmit the first channel information that has been dropped at a specific point of time before a subframe in which the first channel information has been scheduled to be subsequently transmitted.

Figure 13:
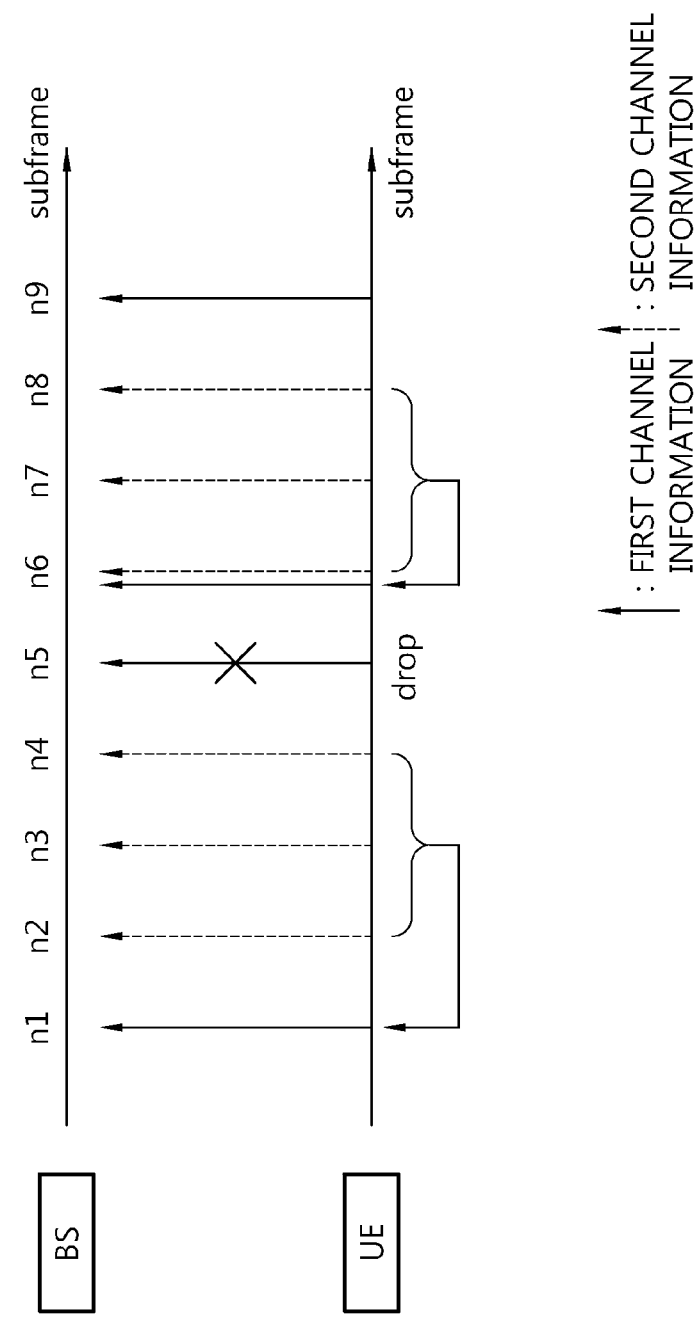
FIG. 13 illustrates a method 3.

FIG. 13 illustrates the method 3.

Referring to FIG. 13, the UE may be configured so that it transmits the second channel information (e.g., a second PMI) in subframes n2 to n4 and n6 to n8 so that the UE transmits the first channel information (e.g., a first PMI) in subframes n1, n5, and n9. Here, the UE may drop the transmission of the first channel information in the subframe n5. In this case, the UE may transmit the first channel information that has been dropped, in the subframe n6, that is, at a point of time at which the second channel information will be subsequently transmitted. Here, the second channel information that has been scheduled to be transmitted in the subframe n6 may be transmitted along with the first channel information or may be dropped. If both the first channel information and the second channel information are transmitted in the subframe n6, a PMI for the second channel information transmitted in the subframes n6 to n8 may be determined based on the first channel information transmitted in the subframe n6.

If the UE transmits an RI and the first channel information separately and generates the first channel information based on an RI, when the UE drops the transmission of an RI at a specific point of time, the UE may generate the first channel information based on an RI that has most recently been transmitted before the specific point of time and transmit the first channel information. If the UE transmits channel information on a plurality of DL CCs, the UE may transmit the first channel information and the RI for each DL CC or DL CC group. Here, if the transmission of an RI for a specific DL CC is dropped, the UE may generate the first channel information on the corresponding DL CC based on an RI that has most recently been transmitted for the corresponding DL CC and transmit the first channel information.

Figure 14:
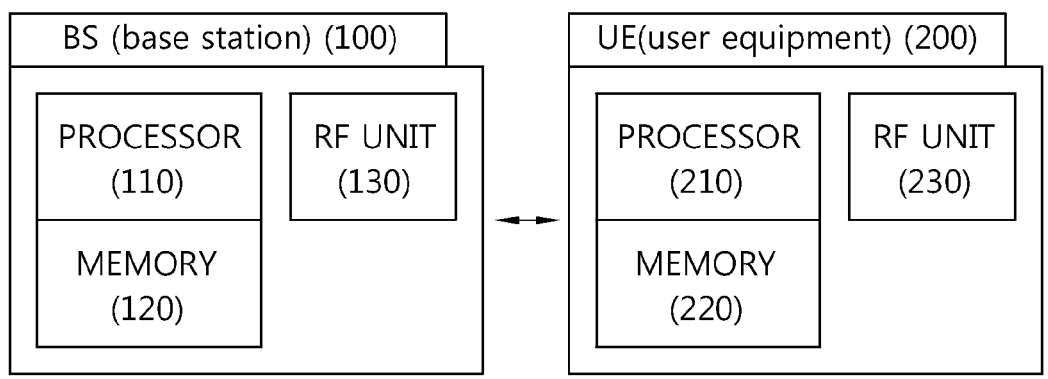
FIG. 14 shows the construction of a mobile station in accordance with an embodiment of the present invention.

FIG. 14 shows the construction of UE in accordance with an embodiment of the present invention.

A BS 100 includes a processor 110, memory 120, and a Radio Frequency (RF) unit 130. The processor 110 embodies the proposed functions, processes and/or methods. For example, the processor 110 transmits configuration information through a higher layer signal, such as RRC, and transmits a reference signal, such as a CSI-RS. Furthermore, the processor 110 determines a precoding matrix using the first channel information and the second channel information that are fed back by UE, applies the precoding matrix to a downlink signal, and transmits the downlink signal. The memory 120 is connected to the processor 110, and it stores various pieces of information for driving the processor 110. The RF unit 130 is connected to the processor 110, and transmits and/or receives radio signals.

UE 200 includes a processor 210, memory 220, and an RF unit 230. The processor 210 embodies the proposed functions, processes and/or methods. For example, the processor 210 receives configuration information from a BS and receives a reference signal. The processor 210 performs channel estimation for a channel with the BS using the reference signal and selects a precoding matrix within a codebook. The processor 210 transmits information on the selected precoding matrix through the first channel information and the second channel information. The memory 220 is connected to the processor 210, and it stores various pieces of information for driving the processor 210. The RF unit 230 is connected to the processor 210, and transmits and/or receives radio signals.

The processor 110, 210 may include Application-Specific Integrated Circuits (ASICs), other chipsets, logic circuits, data processors and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When the above-described embodiment is embodied in software, the above-described scheme may be embodied into a module (process or function) that performs the above function. The module may be stored in the memory 120, 220 and executed by the processor 110, 210. The memory 120, 220 may be placed inside or outside the processor 110, 210 and may be connected to the processor 110, 210 using a variety of well-known means.

Although the some embodiments of the present invention have been described above, a person having ordinary skill in the art will appreciate that the present invention may be modified and changed in various ways without departing from the technical spirit and scope of the present invention. Accordingly, the present invention is not limited to the embodiments and the present invention may be said to include all embodiments within the scope of the claims below.

What is claimed is:

1. A method for transmitting channel status information in a wireless communication system, the method performed by a user equipment (UE) and comprising:
   transmitting first channel information indicating a set of precoding matrices to a base station (BS) in subframes having a first period; and
   transmitting second channel information indicating one precoding matrix included in the set of precoding matrices to the BS in subframes having a second period,
   wherein the second channel information transmitted in a specific subframe is determined based on the first channel information that has most recently been transmitted before the specific subframe,
   wherein a channel quality indicator (CQI) transmitted in the specific subframe is calculated based on one precoding matrix specified by the first channel information that has most recently been transmitted before the specific subframe and by the second channel information determined based on the first channel information that has most recently been transmitted before the specific subframe, and
   wherein if the first channel information is dropped in a subframe included in the subframes having the first period, the second channel information transmitted after the subframe is determined based on first channel information that has most recently been transmitted before the subframe included in the subframes having the first period.

2. The method of claim 1, wherein the first period is greater than the second period.

3. The method of claim 1, wherein the first channel information and the second channel information are transmitted through a physical uplink control channel (PUCCH).

4. A user equipment (UE), comprising:
   a radio frequency (RF) unit configured to transmit and receive radio signals; and
   a processor connected to the RF unit,
   wherein the processor is configured to:
      transmit first channel information indicating a set of precoding matrices to a base station (BS) in subframes having a first period, and
      transmit second channel information indicating one precoding matrix included in the set of precoding matrices to the BS in subframes having a second period,
   wherein the second channel information transmitted in a specific subframe is determined based on the first channel information that has most recently been transmitted before the specific subframe,
   wherein a channel quality indicator (CQI) transmitted in the specific subframe is calculated based on one precoding matrix specified by the first channel information that has most recently been transmitted before the specific subframe and by the second channel information determined based on the first channel information that has most recently been transmitted before the specific subframe, and
   wherein if the first channel information is dropped in a subframe included in the subframes having the first period, the second channel information transmitted after the subframe is determined based on first channel information that has most recently been transmitted before the subframe included in the subframes having the first period.

5. The UE of claim 4, wherein the first period is greater than the second period.

6. The UE of claim 4, wherein the first channel information and the second channel information are transmitted through a physical uplink control channel (PUCCH).

* * * * *